(12) United States Patent
Essiambre et al.

(10) Patent No.: US 9,778,418 B2
(45) Date of Patent: Oct. 3, 2017

(54) MULTI-MODE OPTICAL TRANSMISSION LINE WITH DIFFERENTIAL MODAL GROUP DELAY COMPENSATION

(71) Applicants: Rene'-Jean Essiambre, Red Bank, NJ (US); Roland Ryf, Aberdeen, NJ (US)

(72) Inventors: Rene'-Jean Essiambre, Red Bank, NJ (US); Roland Ryf, Aberdeen, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 443 days.

(21) Appl. No.: 13/629,171

(22) Filed: Sep. 27, 2012

(65) Prior Publication Data

US 2014/0079392 A1    Mar. 20, 2014

Related U.S. Application Data

(60) Provisional application No. 61/701,613, filed on Sep. 15, 2012.

(51) Int. Cl.
| | |
|---|---|
| *H04J 14/04* | (2006.01) |
| *G02B 6/26* | (2006.01) |
| *G02B 6/028* | (2006.01) |
| *H04B 10/2543* | (2013.01) |
| *H04B 10/2581* | (2013.01) |

(52) U.S. Cl.
CPC ........... *G02B 6/268* (2013.01); *G02B 6/0288* (2013.01); *H04B 10/2543* (2013.01); *H04B 10/2581* (2013.01); *H04J 14/04* (2013.01)

(58) Field of Classification Search
None
See application file for complete search history.

(56) References Cited

U.S. PATENT DOCUMENTS

| | | | |
|---|---|---|---|
| 5,559,920 A | 9/1996 | Chraplyvy et al. | |
| 6,266,457 B1* | 7/2001 | Jacob | G02B 6/278 385/11 |
| 2013/0230319 A1 | 9/2013 | Essiambre et al. | |
| 2013/0243380 A1* | 9/2013 | Maruyama | G02B 6/02 385/123 |

(Continued)

FOREIGN PATENT DOCUMENTS

WO    WO 2013/031649 A1    3/2013

OTHER PUBLICATIONS

Ryf, Roland et al., "Multimode Optical Communication Apparatus and Methods", U.S. Appl. No. 61/608,139, filed Mar. 8, 2012.

(Continued)

*Primary Examiner* — Ken N Vanderpuye
*Assistant Examiner* — David Lambert
(74) *Attorney, Agent, or Firm* — John F. McCabe

(57) ABSTRACT

An apparatus includes an all-optical transmission line having, at one wavelength, a pair of relatively orthogonal optical propagating modes whose local group velocities differ along a part of the all-optical transmission line. The all-optical transmission line is formed by a sequence of optically end-connected multi-mode fiber segments. The segments include, at least, 80% of the optical path length of the all-optical transmission line. Each segment is configured such that a differential group delay between the pair varies monotonically there along and changes by, at least, 200 pico-seconds thereon.

10 Claims, 2 Drawing Sheets

(56) References Cited

U.S. PATENT DOCUMENTS

2014/0055843 A1    2/2014  Roland et al.
2014/0093205 A1*   4/2014  Gruner-Nielsen et al. ..... 385/43
2014/0126915 A1*   5/2014  Gruner-Nielsen et al. ... 398/143
2014/0153922 A1    6/2014  Ryf et al.

OTHER PUBLICATIONS

Essiambre, Rene'-Jean et al., "Mode Coupler for Mode-Multiplexed Transmission", U.S. Appl. No. 61/669,612, filed Jul. 9, 2012.
Essiambre, Rene'-Jean et al., "Spot-Based Coupling in Multi-Mode Optical Communication", U.S. Appl. No. 61/701,646, filed Sep. 15, 2012.
Roland Ryf et al., U.S. Appl. No. 61/701,646, filed Sep. 15, 2102, 22 pages.
Roland Ryf et al., U.S. Appl. No. 61/692,735, filed Aug. 24, 2012, 29 pages.

* cited by examiner

MULTI-MODE OPTICAL TRANSMISSION LINE WITH DIFFERENTIAL MODAL GROUP DELAY COMPENSATION

This application claims the benefit of U.S. provisional application 61/701,613, which was filed on Sep. 15, 2012 by René-Jean Essiambre and Roland Ryf.

BACKGROUND

Technical Field

The inventions relate to apparatus including multi-mode optical fiber and methods to use such devices.

Discussion of the Related Art

This section introduces aspects that may be helpful to facilitating a better understanding of the inventions. Accordingly, the statements of this section are to be read in this light and are not to be understood as admissions about what is prior art or what is not prior art.

Herein, a multi-mode optical fiber is an optical fiber having orthogonal optical propagating modes with different lateral light intensity profiles, i.e., different spatial intensity profiles. Often, such fibers also have optical propagating modes with different angular momentum eigenvalues.

In an optical transmission system having optical transmission span(s) of multi-mode optical fiber, imperfections in the optical transmission span(s) and/or optical couplers between said spans may lead to mixing of light carried on different optical propagating modes. That is, the optical fiber transmission line may have an effective channel matrix that is non-diagonal between various optical propagating modes with different lateral light intensity profiles. Such linear mixing or crosstalk may be separated out in an optical receiver that implements multi-input-multiple-output (MIMO) processing and/or equalization. Removing such linear mixing typically involves mixing detected light values from the different optical propagating modes, as measured at the optical receiver, over temporal intervals of the order of differential group delays between said optical propagating modes. To reduce the complexity of such equalization and/or MIMO processing it is typically desirable to keep group delays between the various optical propagating modes small.

BRIEF SUMMARY OF SOME EMBODIMENTS

Embodiments of a first apparatus include an all-optical transmission line having, at one wavelength, a pair of relatively orthogonal optical propagating modes whose local group velocities differ along a part of the all-optical transmission line. The all-optical transmission line is formed by a sequence of optically end-connected multi-mode fiber segments. The segments include, at least, 80% of the optical path length of the all-optical transmission line. Each segment is configured such that a differential group delay between the pair varies monotonically there along and changes by, at least, 200 pico-seconds thereon.

In some embodiments of the first apparatus, each multi-mode fiber segment may be such that a differential group delay between the pair changes by, at least, 1 nano-second thereon.

In some embodiments of the first apparatus, each multi-mode fiber segment may be such that a differential group delay between the pair changes by, at least, 5 nano-second thereon.

In any of the above embodiments of the first apparatus, a part of the sequence of the multi-mode fiber segments may form a hybrid optical fiber. A difference between the local group velocities has opposite sign on physically neighboring ones of the segments of the part. In some such embodiments, each multi-mode fiber segment may be such that a differential group delay between the pair changes by, at least, 1 nano-second thereon. In some embodiments of this paragraph, an accumulated differential group delay between the pair may change by, at least, 200 pico-seconds along each of the segments of the part.

In any of the above embodiments of the first apparatus, two of the multi-mode fiber segments may be optically connected by an optical end-connector including a lumped differential group delay compensator. In such embodiments, each multi-mode fiber segment may be such that a differential group delay between the pair changes by, at least, 1 nano-second thereon or changes by, at least, 5 nano-second thereon.

In any of the above embodiments, the first apparatus may further include an optical receiver connected to one end of the all-optical transmission line. The optical receiver may include a processor configured to partially remove linear crosstalk accumulated between the optical propagating modes in the all-optical transmission line.

In any of the above embodiments, the first apparatus may further include an optical transmitter configured to transmit first and second differently data-modulated optical carriers to the optical propagating modes of the pair.

Embodiments of a second apparatus include an all-optical transmission line formed by a series of multi-mode optical fibers. The fibers have, at one wavelength, a set of relatively orthogonal optical propagating modes with different lateral light intensity profiles. At least one of the optical couplers includes an optical element selected from the group consisting of a spatial mode multiplexer, a spatial mode de-multiplexer, an optical amplifier, and a modal reconfigurable optical add-drop multiplexer. The all-optical transmission line is configured such that different ones of said optical propagating modes have cumulative group delays that differ by, at most, 100 nano-seconds in said optical element.

In various embodiments of the second apparatus, the all-optical transmission line may be configured such that different ones of said optical propagating modes have cumulative group delays that differ by, at most, 30 nano-seconds, 10 nano-seconds, 3 nano-seconds, or 1 nano-second in said optical element.

In some of the above embodiments, the second apparatus may further include a differential group delay compensator in said optical element.

In any of the above embodiments of the second apparatus, a part of the series may form a hybrid optical fiber of optical multi-mode fiber segments. A difference between local group velocities of a pair of the optical propagating modes has opposite signs on physically neighboring ones of the optical multi-mode fiber segments. In some such embodiments, each optical multi-mode fiber segment may be such that a differential group delay between the pair of the modes changes by, at least, 200 pico-seconds thereon.

In any of the above embodiments of the second apparatus, each of the optical propagating modes may have a group velocity that varies over a corresponding range for light in one of the optical telecommunications C-band, the optical telecommunications L-band the optical telecommunications S-band. Here, the ranges correspond to different ones of the modes are non-overlapping and the ranges of a group velocity-adjacent pair of the ranges are separated by a nonzero gap of less than about 10,000 meters per second.

In any of the above embodiments of the second apparatus, a second pair of the fibers in the series may be end-connected by a second optical coupler, which includes a second optical element. The second optical element is selected from the group consisting of a spatial mode multiplexer, a spatial mode de-multiplexer, an optical amplifier, and a modal reconfigurable optical add-drop multiplexer. The all-optical transmission line is configured such that different ones of said optical propagating modes have cumulative group delays that differ by at most 100 nano-seconds in said second optical element.

BRIEF DESCRIPTION OF THE FIGURES

In the Figures and text like or similar reference numbers refer to functionally and/or structurally similar elements.

Figure 1A:
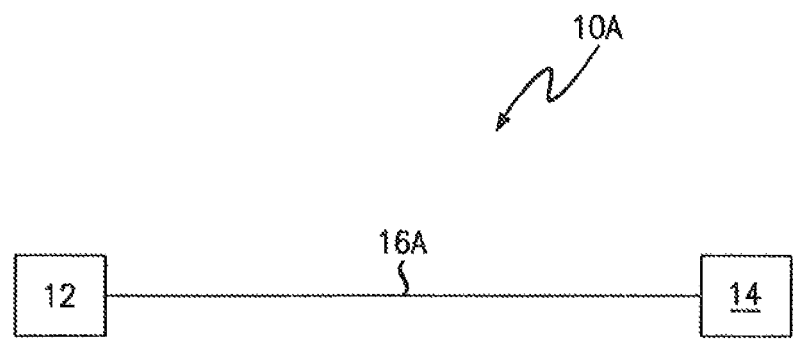
FIG. 1A illustrates a first embodiment of an optical communication system in which an all-optical transmission line has a series of connected multi-mode optical fiber segments.

In the Figures, the relative dimensions of some features may be exaggerated to more clearly illustrate apparatus therein.

Herein, various embodiments are described more fully by the Summary Figures, and Detailed Description of the Illustrative Embodiments. Nevertheless, the inventions may be embodied in various forms and are not limited to the specific embodiments described in the Summary, Figures and Detailed Description of the Illustrative Embodiments.

DESCRIPTION OF THE ILLUSTRATIVE EMBODIMENTS

To reduce undesired signal degradations associated with nonlinear optical effects, some optical communication systems may use transmission multi-mode optical fiber segment (s), in which, at least, an individual pair of orthogonal optical propagating modes has a large differential group velocity (DGV), e.g., modes with different radial light intensity profiles. The large DGV can aid to average nonlinear optical interactions between the pair of optical propagating modes. If such a system also produces significant linear mixing of the light carried on the two optical propagating modes of the pair, e.g., due to fiber defect(s), fiber bend(s), and/or lumped end-to-end fiber couplers, electronic or optical equalization and/or MIMO processing may be used in the optical receiver to remove such linear mixing or crosstalk. In such circumstances, the frequent performance of compensation of the accumulated differential group delay between the pair of optical propagating modes would seem, at least at first consideration, to reduce the need for a complex and/or a large electronic or optical equalizer or MIMO processing system in the optical receiver.

Nevertheless, the inventors believe that such frequent compensation of the accumulated differential group delay (DGD) between such a pair of optical propagating modes should not be performed too frequently due to nonlinear optical effects. In particular, the inventors believe that allowing the DGD between the optical signal streams, carried by such a pair of optical propagation modes, to accumulate to a larger magnitude, i.e., between points of compensation of such accumulated DGD, enables the nonlinear optical interactions between the pair to be averaged over longer segments of the optical data streams thereby better averaging out. Thus, the inventors believe it to be often desirable to relatively infrequently compensate the accumulated DGD between such a pair even though concerns over the complexity of electronic or optical equalization and/or MIMO processing might otherwise indicate that such compensation should be performed frequently, e.g., when the optical propagating modes have large DGV(s).

Such compensation of the accumulated DGD between optical propagating modes with non-degenerate phase velocities may be performed via hybrid multi-mode optical fiber (MMF), i.e., DGV-type-hybrid fiber, and/or via lumped optical DGD compensators. In optical transmission systems either with either of these types of DGD compensation, the inventors believe it may be desirable to enable DGD to accumulate:

for, at least, 200 pico-seconds (ps),
often preferably for, at least, 1 nano-second (ns), and
possibly even for, at least, 5 ns, on an individual MMF segment prior to performing DGD compensation. Such large accumulations of DGD are believed to be typically desirable, at least, between any pair of non-degenerate optical propagating modes, i.e., a pair with different phase velocities, which substantially linear mixes or undergoes substantial crosstalk.

Figure 1B:
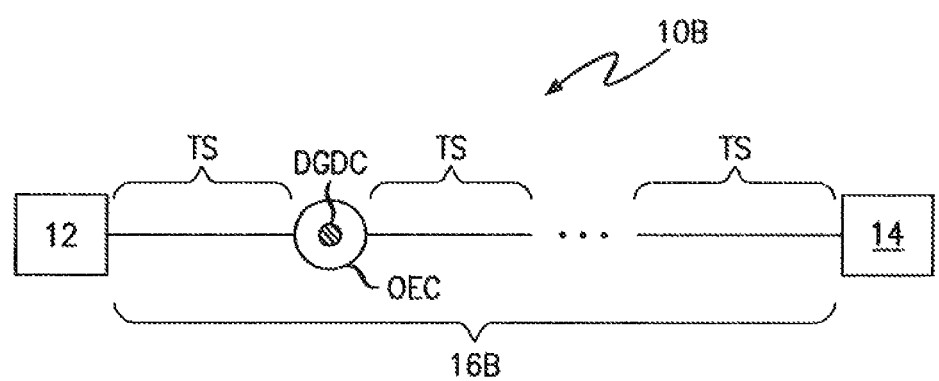
FIG. 1B illustrates a second embodiment of an optical communication system in which an all-optical transmission line has a series of multi-mode optical fiber segments and, at least, one localized or lumped optical connector connecting a pair of the segments.

FIGS. 1A and 1B show alternate optical transmission systems 10A, 10B, in which one or more or even all transmission spans or segments TS of MMF have, at least, one pair of orthogonal optical propagating modes with large DGV. For example, 80 percent or more or even 90 percent or more of the optical path length of such an optical transmission system may be in multi-mode optical fiber segments with such a characteristic. Typically, more than two pairs of such mutually orthonormal propagating modes will have a large DGV in such MMF segments. Such mutually orthonormal optical propagating modes locally differ in their radial light intensity profiles and/or their angular momentum profile and will often be referred to as "spatial modes" herein.

Figure 1C:
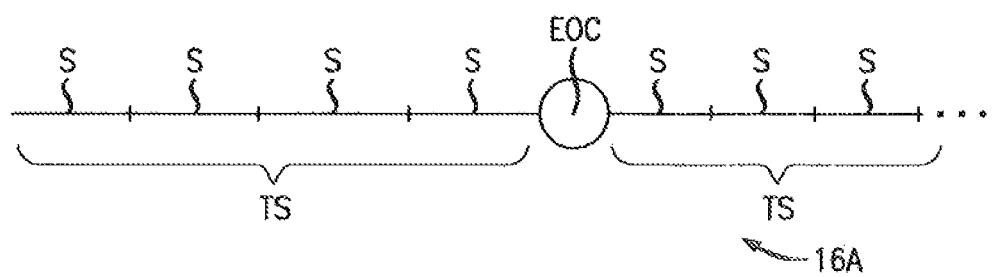
FIG. 1C illustrates a portion of an all-optical transmission line in the optical communication system of FIG. 1A.

Referring to FIG. 1A, the system 10A includes an optical transmitter 12, an optical receiver 14, and an all-optical transmission line 16A, which optically connecting the optical transmitter 12 to the optical receiver 14. As shown in FIG. 1C, the all-optical fiber transmission line 16A includes a series of one or more transmission spans or segments TS of MMF. In embodiments with multiple transmission segments or spans of MMF, each pair of successive transmission spans of the series is optically connected by an optical end-coupler EOC. Individual ones of the optical end-couplers EOC of such pairs of spans or segments TS may or may not include one or more active optical devices such as an optical amplifier and/or optical wavelength converter.

In the optical transmission system 10A, one or more of the transmission segments or spans TS of MMF of the all-optical fiber transmission line 16A are formed by optical hybrid fibers as illustrated, e.g., in FIG. 1C. In such embodiments, one or more of the transmission spans or segments TS is formed of a sequence of end-connected MMF segments S, i.e., forming a DGD-type hybrid fiber segment. In the DGD-type hybrid fiber segment, successive MMF segments S have a DGV of opposite sign between, at least, a pair of orthonormal optical propagating modes, i.e., and possibly between a plurality of such pairs. That is, an alternating sign of said DGV along the hybrid optical fiber segment provides part or all of the DGD compensation, but does not require that the DGV itself be small.

In this embodiment, the individual MMF segments S, i.e., upon which said DGV has the same sign, are long enough to ensure the DGD between the relevant one more pairs of optical propagating modes change(s) by, at least, 200 ps; often being configured to change by, at least, 1 nano-second; and possibly even being configured to change by, at least, 5 nano-seconds.

Based on the present disclosure, a person of ordinary skill in the relevant arts would be able to design and fabricate hybrid multi-mode optical fibers, i.e., as described above. In particular, such a person would be able to design and fabricate such a hybrid optical fiber having few mutually orthonormal spatial optical propagating modes. For example, a multi-mode optical fiber with 6 approximately linearly polarized (LP) modes, i.e., the $LP_{10}$ modes and the doubly-degenerate $LP_{11}$ modes of both polarizations, can easily be designed based on the design of a "balanced" step-index optical multi-mode fiber in which the $LP_{10}$ and $LP_{11}$ modes have the same group velocity, i.e., a DGV of zero. To understand the design of such a hybrid optical fiber, it is noted that the group velocity of the $LP_{10}$ mode is more strongly affected by the value of the optical index in the optical core than the $LP_{11}$ modes, because light of the $LP_{10}$ mode is more concentrated in the optical core than light of the $LP_{11}$ modes. Thus, increasing the optical core-cladding refractive-index contrast of such a "balanced" step-index optical multi-mode optical fiber should cause the resulting optical fiber to have a differential group velocity of one sign between the $LP_{10}$ and $LP_{11}$ modes, and decreasing the optical core-cladding refractive-index contrast of such a "balanced" step-index optical multi-mode optical fiber should cause the fiber to have a differential group velocity of the opposite sign between the $LP_{10}$ and $LP_{10}$ modes. Thus, one hybrid optical fiber may be formed of a connected sequence of multi-mode optical fiber segments. In the sequence, the even segments have an optical core-cladding refractive-index contrast increased with respect to that of the "balanced" step-index optical multi-mode optical fiber, and the odd segments have an optical core-cladding refractive-index contrast decreased with respect to that of the "balanced" step-index optical multi-mode optical fiber.

Referring to FIG. 1B, the system 10B includes an optical transmitter 12, an optical receiver 14, and an all-optical transmission line 16B optically connecting the optical transmitter 12 to the optical receiver 14. The all-optical fiber transmission line 16B includes a series transmission spans or segments TS of MMF and a local or lumped optical end-connector OEC optical connecting each pair of successive transmission spans or segments TS of the series. Individual ones of the optical end-couplers EOC of such pairs of spans or segments TS may or may not include one or more active optical devices such as an optical amplifier and/or optical wavelength converter.

In this embodiment, one or more of the optical end-connectors OEC includes a lumped DGD compensator DGDC. But, the transmission span(s) or segment(s) TS and/or the distribution of the DGD compensator(s) DGDC in some or all of the optical end-connectors OEC is configured so that DCD compensation is not too frequent. In the all-optical transmission line 16B, between neighboring optical end-connectors OEC having lumped DGD compensators DGDC, the DGD of, at least, one pair of orthonormal spatial optical propagating modes changes, at least, by 200 pico-seconds; may change, by, at least, 1 nano-second; and may even change by, at least, 5 nano-seconds.

Various alternate embodiments may differ from the optical transmission systems 10A, 10B of FIGS. 1A and 1B.

For example, the all-optical fiber transmission line may differ from the example all-optical fiber transmission lines 16A, 16B of FIGS. 1A-1B.

In various embodiments, the all-optical transmission line, e.g., elements 16A and 16B of FIGS. 1A-1B, is formed by a sequence of all-optically connected transmission spans or segments of multi-mode optical fiber, and the all-optical transmission line has, at one wavelength, two or more of relatively orthogonal optical propagating modes whose group velocities differ locally along almost all of the all-optical transmission line. For example, the group velocities of the modes of such a pair may locally differ along, at least, 80% of the optical path length of such an all-optical transmission line or along, at least, 90% of said optical path length of such an all-optical transmission line in examples of such a line that advantageously reduce degradation caused by nonlinear optical effects. Typically, almost all individual multi-mode optical fiber segments of such a line are such that a differential group delay between each pair of such non-degenerate optical propagating modes varies monotonically along such an individual segment and changes by, at least, 200 pico-seconds; may change by, 1 nano-second or more, and even may change by 5 nano-seconds or more along such an individual segment. While the segments are located along a contiguous portion of the all-optical fiber transmission line, the segments do not necessarily make up the entire optical path length of such a contiguous portion. For example, even if only 80% or more or preferably 90% or more of the optical path length of such a contiguous portion is located in such multi-mode fiber segments, the form of the segments can still substantially reduce the amount of optical degradation due to non-transmission linear optical effects thereon. The remainder of the optical path length may, e.g., be located in the optical connectors OEC between the segments. In addition, the contiguous portion may or may not form the entire optical path between the optical transmitter 12 and optical receiver 14 and still be advantageous with respect to providing lower degradation due to nonlinear optical effects.

Other embodiments may combine the features of the optical fiber transmission lines 16A and 16b of FIGS. 1A and 1B. Some such embodiments may combine in-fiber compensation of differential group delay (DGD) between the optical propagating modes via the above-described types of hybrid multi-mode optical fiber and local or lumped DGD compensators between one or more adjacent pairs of the transmission spans or segments TS of multi-mode optical fiber of the all-optical transmission line.

Figure 2:
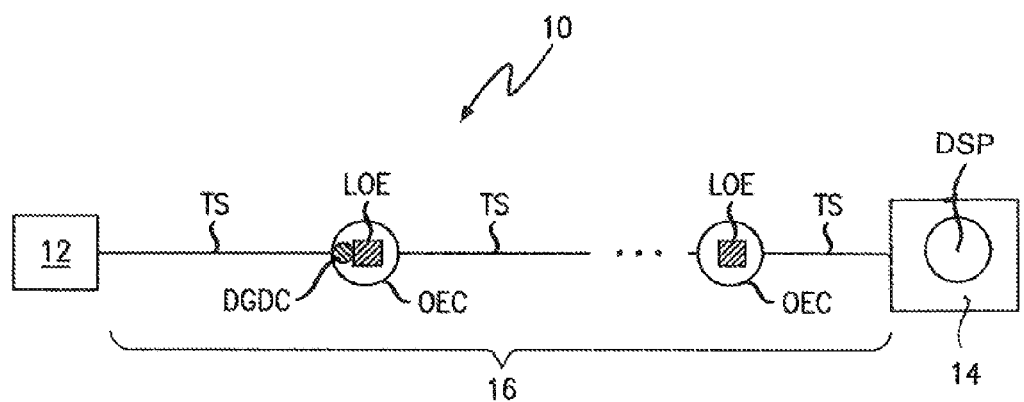
FIG. 2 illustrates an optical communication system that includes one or more localized or lumped optical elements that produce(s) substantial linear crosstalk between, at least, a pair of orthonormal spatial optical propagating modes.

FIG. 2 illustrates another embodiment of an optical transmission system 10 in which one or more or even all transmission spans or segments TS of MMF have, at least, one pair of orthonormal optical propagating modes with substantial local DGV in the transmission spans or segments.

The optical transmission system 10 includes an optical transmitter 12, an optical receiver 14, and an all-optical transmission line 16 optically connecting the optical transmitter 12 to the optical receiver 14. The all-optical transmission line 16 includes a series of one or more transmission spans or segments TS of MMF. In embodiments with multiple transmission spans or segments TS, each pair of successive transmission spans or segments TS of the series is optically connected by an optical end-coupler EOC as already described.

The optical transmission system 10 has one or more localized or lumped optical elements LOE that produce(s) substantial linear mixing, i.e., optical crosstalk, of different ones of the orthonormal spatial optical propagating modes. In some embodiments, most of or even almost all of such linear mixing of said optical propagating modes along the all-optical transmission line may occur in the one or more localized optical elements LOE. Forms of such localized optical elements LOE, which generate substantial transmission linear mixing or crosstalk, may include:
- an optical spatial-propagating-mode multiplexer,
- an optical spatial-propagating-mode de-multiplexer,
- an optical amplifier, and
- a modal reconfigurable optical add-drop multiplexer (e.g., to selectively add and/or drop mode(s)).

Herein, an optical element such as an optical spatial-propagating-mode multiplexer, an optical spatial-propagating-mode de-multiplexer, and a modal reconfigurable optical add-drop multiplexer routes light based on the spatial optical propagating mode of the light in an MMF optically connected to said optical element.

The optical transmission system 10 is configured to simplify such linear optical mixing in said one or more localized or lumped optical elements LOE by substantially reducing DGD therein, i.e., to substantially temporally align the inter-modal crosstalk produced in the localized or lumped optical elements LOE. For example, the optical transmission system 10 may include a suitable DGD compensator DCDC at or near the input of one or more of or even at the input of each of said localized optical elements LOE. Such a DCD compensator is configured to substantially temporally align various orthonormal spatial optical propagating modes, e.g., such that each linearly interfering pair of said modes have, at most a small differential group delay, in the localized optical element(s) LOE. The substantial temporal alignment of the linear mixing of such optical propagating modes in the one or more localized optical elements LOE may enable simplified MIMO processing and/or equalization at the optical receiver 14. Typically, after such temporal alignment at the individual localized sources of substantial inter-modal optical crosstalk, the accumulated DGD may be finally compensated by optical or electronic means, at the optical receiver 14, to substantially re-align the inter-modal optical crosstalk, e.g., that has accumulated along the entire optical transmission line 16. The ability to make such an alignment of "accumulated" inter-modal crosstalk can result in the availability of simpler MIMO processing and/or equalization in the optical receiver 14. Such "substantial temporal alignment" of the inter-modal crosstalk may enable such MIMO processing and/or equalization to be performed over portions of detected symbol streams of shorter length. Thus, such "substantial temporal alignment" may enable reduced complexity in a digital signal processor DSP of the optical receiver 14 that performs said MIMO processing and/or equalization.

In different embodiments, any intermediate DGD compensators, e.g., the lumped or localized elements DGDC, may produce different levels of "substantial temporal alignment" between the orthonormal non-degenerate spatial optical propagating modes in the one or more localized optical elements LOE. In embodiments where the optical data transmission is based on time division multiplexing, the inventors believe that the "substantial temporal alignment" may preferably:
- leave a residual DGD of, at most, 10 ns in the one or more local optical elements LOE,
- often, may leave a residual DGD of, at most, 3 ns in the local optical element(s) LOE, and
- may even leave a residual DGD of, at most, 1 ns in such local optical element(s) LOE.

In embodiments where optical data transmission is based on optical frequency division multiplexing (OFDM), the inventor(s) believe that the "substantial temporal alignment" of DGD may be much less restrictive due to the larger temporal length of symbols. In such embodiments, the DGD compensation may:
- leave a residual DGD of, at most, 100 ns in the local optical element(s) LOE,
- often, may leave a residual DGD of, at most, 30 ns in the local optical element(s) LOE, and
- may even leave a residual DGD of, at most, 10 ns in such local optical element(s) LOE.

Various optical transmission systems of this application may incorporate a variety of optical components that would be known to persons of ordinary skill in the relevant arts based on the present disclosure. The optical transmission lines 16, 16A, 16B of FIGS. 2, 1A, and 1B may incorporate, e.g., multi-mode optical fiber segments described in U.S. patent application Ser. No. 13/539,371, filed on Jun. 30, 2012. The optical transmitter 12 of FIGS. 1A, 1B, and 2 may incorporate, e.g., one or more multi-mode optical couplers and/or an optical transmitter as described in:
- U.S. provisional patent application No. 61/608,139, filed Mar. 8, 2012;
- U.S. provisional patent application No. 61/669,612, filed Jul. 9, 2012, and/or
- U.S. provisional patent application No. 61/701,646, "SPOT-BASED COUPLING IN MULTI-MODE OPTICAL COMMUNICATION", which is being filed on Sep. 15, 2012, by Rene-Jean Essiambre, Nicolas Fontaine, and Roland Ryf.

The optical end connectors OEC and/or localized or lumped optical elements LOE of FIGS. 1A, 1B, and 2 may incorporate multi-mode optical amplifiers as described in U.S. provisional patent application No. 61/692,735, filed Aug. 24, 2012. The U.S. patent applications of this paragraph are incorporated herein by reference in their entirety.

The inventions are intended to include other embodiments that would be obvious to one of skill in the art in light of the description, figures, and claims.

What we claim is:

1. An apparatus comprising:
an all-optical transmission line having, at one wavelength, at least, a pair of orthogonal optical propagating modes having different radial light intensities and having differing local group velocities along a part of the all-optical transmission line; and
wherein the all-optical transmission line includes a sequence of optically end-connected multi-mode fiber segments, the segments including at least 80 percent of the optical path length of the all-optical transmission line, each segment being such that a differential group delay between the orthogonal optical propagating modes of the pair varies monotonically there along changing by, at least, 200 pico-seconds thereon; and
wherein a part of the sequence includes a plurality of the multi-mode fiber segments connected to form a hybrid optical fiber, a difference between the local group velocities having opposite sign on physically neighboring ones of the segments of the hybrid optical fiber.

2. The apparatus of claim 1, wherein each multi-mode fiber segment is such that a differential group delay between the orthogonal optical propagating modes of the pair changes by, at least, 1 nano-second thereon.

3. The apparatus of claim 1, wherein one of the multi-mode fiber segments is such that a differential group delay between the orthogonal optical propagating modes of the pair changes by, at least, 5 nano-seconds thereon.

4. The apparatus of claim 1, wherein an accumulated differential group delay between the orthogonal optical propagating modes of the pair changes by, at least, 200 pico-seconds along each segment of the part of the all-optical transmission line.

5. An apparatus comprising:
an all-optical transmission line having, at one wavelength, at least, a pair of orthogonal optical propagating modes having different radial light intensities and having differing local group velocities along a part of the all-optical transmission line; and
wherein the all-optical transmission line includes a sequence of optically end-connected multi-mode fiber segments, the segments including at least 80 percent of the optical path length of the all-optical transmission line, each segment being such that a differential group delay between the orthogonal optical propagating modes of the pair varies monotonically there along changing by, at least, 200 pico-seconds thereon; and
wherein two of the multi-mode fiber segments are optically connected by an optical end-connector including a lumped differential group delay compensator of the orthogonal optical propagating modes having different radial light intensities.

6. The apparatus of claim 5, wherein each multi-mode fiber segment is such that a differential group delay between the orthogonal optical propagating modes of the pair changes by, at least, 1 nano-second thereon.

7. The apparatus of claim 5, wherein one of the multi-mode fiber segments is such that a differential group delay between the orthogonal optical propagating modes of the pair changes by, at least, 5 nano-seconds thereon.

8. The apparatus of claim 1, further comprising an optical receiver connected to one end of the all-optical transmission line, the optical receiver including a processor configured to partially remove linear crosstalk accumulated between the optical propagating modes in the all-optical transmission line.

9. The apparatus of claim 1, further comprising an optical transmitter configured to transmit first and second differently data-modulated optical carriers to the optical propagating modes of the pair.

10. The apparatus of claim 5, wherein a part of the sequence includes a plurality of the multi-mode fiber segments connected to form a hybrid optical fiber, a difference between the local group velocities having opposite sign on physically neighboring ones of the segments of the hybrid optical fiber.

* * * * *